(12) United States Patent
Waclawsky et al.

(10) Patent No.: US 11,353,947 B2
(45) Date of Patent: *Jun. 7, 2022

(54) SYSTEMS, METHODS, AND APPARATUSES FOR POWERLINE COMMUNICATION

(71) Applicant: Echelon Corporation, Santa Clara, CA (US)

(72) Inventors: John G. Waclawsky, Alpine, WY (US); Sohrab Modi, Oakland, CA (US)

(73) Assignee: Echelon Corporation, Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/674,630

(22) Filed: Nov. 5, 2019

(65) Prior Publication Data

US 2020/0142474 A1    May 7, 2020

Related U.S. Application Data

(62) Division of application No. 14/588,115, filed on Dec. 31, 2014, now Pat. No. 10,474,223.

(51) Int. Cl.
*G06F 1/00* (2006.01)
*G06F 1/3296* (2019.01)
(Continued)

(52) U.S. Cl.
CPC ............ *G06F 1/3296* (2013.01); *G06F 1/266* (2013.01); *H04B 3/54* (2013.01); *G06F 1/3203* (2013.01);
(Continued)

(58) Field of Classification Search
CPC ...... G06F 1/3296; G06F 1/266; G06F 1/3209; G06F 1/3203; H04B 3/54; H04B 2203/5425
(Continued)

(56) References Cited

U.S. PATENT DOCUMENTS 4,367,455 A * 1/1983 Fried .................. G08B 13/00
340/538
5,491,463 A * 2/1996 Sargeant ............... H04B 3/542
340/12.37

(Continued)

FOREIGN PATENT DOCUMENTS

WO    2011/154087 A1    12/2011

OTHER PUBLICATIONS

Extended European Search Report for Application No. 15203256.1, dated Jun. 1, 2016, 14 pages.
(Continued)

*Primary Examiner* — Volvick Derose
(74) *Attorney, Agent, or Firm* — Nicholson De Vos Webster & Elliott, LLP

(57) ABSTRACT

Systems, methods, and apparatuses for improved powerline communication (PLC) are described. In one embodiment, a system comprises power down hardware coupled to internal wiring of a premises to selectively power down a portion of the internal wiring on request, and at least one hardware device to transmit a request to the power down hardware to selectively power down a portion of the internal wiring on request and to transmit data using power line communication hardware of the at least one hardware device while the portion of the internal wiring is powered down.

10 Claims, 9 Drawing Sheets

(51) Int. Cl.
*G06F 1/26* (2006.01)
*H04B 3/54* (2006.01)
*G06F 1/3203* (2019.01)
*G06F 1/3209* (2019.01)

(52) U.S. Cl.
CPC .... *G06F 1/3209* (2013.01); *H04B 2203/5425* (2013.01)

(58) Field of Classification Search
USPC .......................................................... 713/310
See application file for complete search history.

(56) References Cited

U.S. PATENT DOCUMENTS

| | | | | |
|---|---|---|---|---|
| 5,504,454 A * | 4/1996 | Daggett | ............... | H04L 27/2331 329/304 |
| 5,812,557 A * | 9/1998 | Stewart | ................... | G01R 31/42 370/252 |
| 5,828,293 A * | 10/1998 | Rickard | ................. | H04B 3/542 375/257 |
| 5,929,749 A * | 7/1999 | Slonim | ............... | H04L 12/2803 340/870.01 |
| 2002/0101695 A1* | 8/2002 | Saksa | ..................... | H02H 3/006 361/64 |
| 2002/0130768 A1* | 9/2002 | Che | ........................ | H04B 3/54 375/259 |
| 2003/0095036 A1* | 5/2003 | Wasaki | .................... | H04B 3/56 375/257 |
| 2003/0158677 A1* | 8/2003 | Swarztrauber | ......... | G01D 4/008 702/62 |
| 2005/0213874 A1* | 9/2005 | Kline | ....................... | H04B 3/56 385/15 |
| 2006/0077046 A1* | 4/2006 | Endo | ........................ | H04B 3/54 340/12.33 |
| 2006/0091877 A1* | 5/2006 | Robinson | ............. | G01R 21/133 324/76.11 |
| 2006/0218269 A1* | 9/2006 | Iwamura | .................. | H04B 3/54 709/224 |
| 2007/0091925 A1* | 4/2007 | Miyazaki | ............... | H04L 12/403 370/469 |
| 2007/0183340 A1* | 8/2007 | Kim | ....................... | H04B 3/542 370/252 |
| 2007/0190840 A1* | 8/2007 | Hanada | .................. | H01R 13/70 439/215 |
| 2008/0080625 A1* | 4/2008 | Miyata | ..................... | H02H 3/08 375/257 |
| 2008/0129468 A1* | 6/2008 | Matsuoka | ......... | H02J 13/00009 375/259 |
| 2008/0167755 A1* | 7/2008 | Curt | ..................... | H02J 13/0075 700/293 |
| 2008/0260010 A1* | 10/2008 | Schwager | ............ | H04B 17/309 375/222 |
| 2008/0278296 A1* | 11/2008 | Noh | ........................ | H04B 3/54 375/259 |
| 2008/0304577 A1* | 12/2008 | Koga | .................... | H04L 1/1671 375/257 |
| 2010/0079006 A1* | 4/2010 | Grice | .................... | H05B 47/10 307/114 |
| 2010/0332691 A1* | 12/2010 | Yoshida | .............. | G06F 13/4081 710/16 |
| 2011/0046806 A1* | 2/2011 | Nagel | ................... | H04L 67/125 700/291 |
| 2011/0241647 A1* | 10/2011 | Hershey | .................. | B60L 53/63 323/355 |
| 2011/0264294 A1* | 10/2011 | Chen | ................ | H04N 21/44231 700/295 |
| 2012/0011388 A1* | 1/2012 | Katou | ...................... | H04B 3/54 713/340 |
| 2012/0093240 A1* | 4/2012 | McFarland | ............. | H04B 3/54 375/257 |
| 2012/0195384 A1* | 8/2012 | Sato | ....................... | H04B 3/544 375/257 |
| 2013/0141074 A1* | 6/2013 | King | .................... | G01S 5/0009 323/355 |
| 2013/0142231 A1* | 6/2013 | Schwager | ................ | H04B 3/54 375/222 |
| 2013/0195208 A1* | 8/2013 | Umehara | ............ | H04L 27/2032 375/257 |
| 2014/0028200 A1* | 1/2014 | Van Wagoner | ........ | H05B 47/10 315/158 |
| 2014/0133585 A1* | 5/2014 | Shen | ...................... | H04B 3/542 375/257 |
| 2014/0180488 A1* | 6/2014 | Hirayama | ............. | H04L 12/283 700/295 |
| 2015/0326279 A1* | 11/2015 | Schneider | ........... | H04L 27/2626 375/257 |
| 2016/0148499 A1* | 5/2016 | Hicks, III | ........... | H04L 12/6418 340/506 |

OTHER PUBLICATIONS

Partial Supplementary European Search Report for Application No. 15203256.1, dated Mar. 11, 2016, 7 pages.

* cited by examiner

SYSTEMS, METHODS, AND APPARATUSES FOR POWERLINE COMMUNICATION

FIELD

The various embodiments described herein relate to powerline communication.

BACKGROUND

Powerline Line Communication (PLC) communicates using power lines commonly found on utility poles and within buildings. PLC advantages can be severely limited by noise and other impairments, which are from, or magnified by, concurrent electrical transmission and the type of wiring being used.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A power-line channel is very hostile to data transmission (especially in the lower frequency regions) and causes propagation loss and severe interference. Additionally, the power-line channel is a very frequency-selective channel and besides background noise, it contains impulsive noise and narrow band interference. One solution to withstand narrow band interference and notches in the transmission channel is to spread the information among several carriers to increase robustness. As a result multi-carrier modulation is used to improve performance. However, this does not always provide a solution for having higher data rates and improved reliability in PLC.

Detailed below are embodiments of systems, methods, and apparatuses for dynamically coordinating power on and off according to data transmission needs. This helps achieve higher data rates and improved reliability for PLC not previously possible. In some embodiments, forced low power modes or power-off intervals can be filled with data transmission, thus enjoying decreased interference. The data transmission characteristics may be selected and subsequently modified in response to specific power line data impairments. Modifying data transmission characteristics (when power is on or off the wire) along with the (optional) use of capacitors and/or batteries at any powered device may also be used to minimize or eliminate the effect of noise and other electrical energy caused impairments to improve PLC performance (both reliability and speed).

Figure 1:
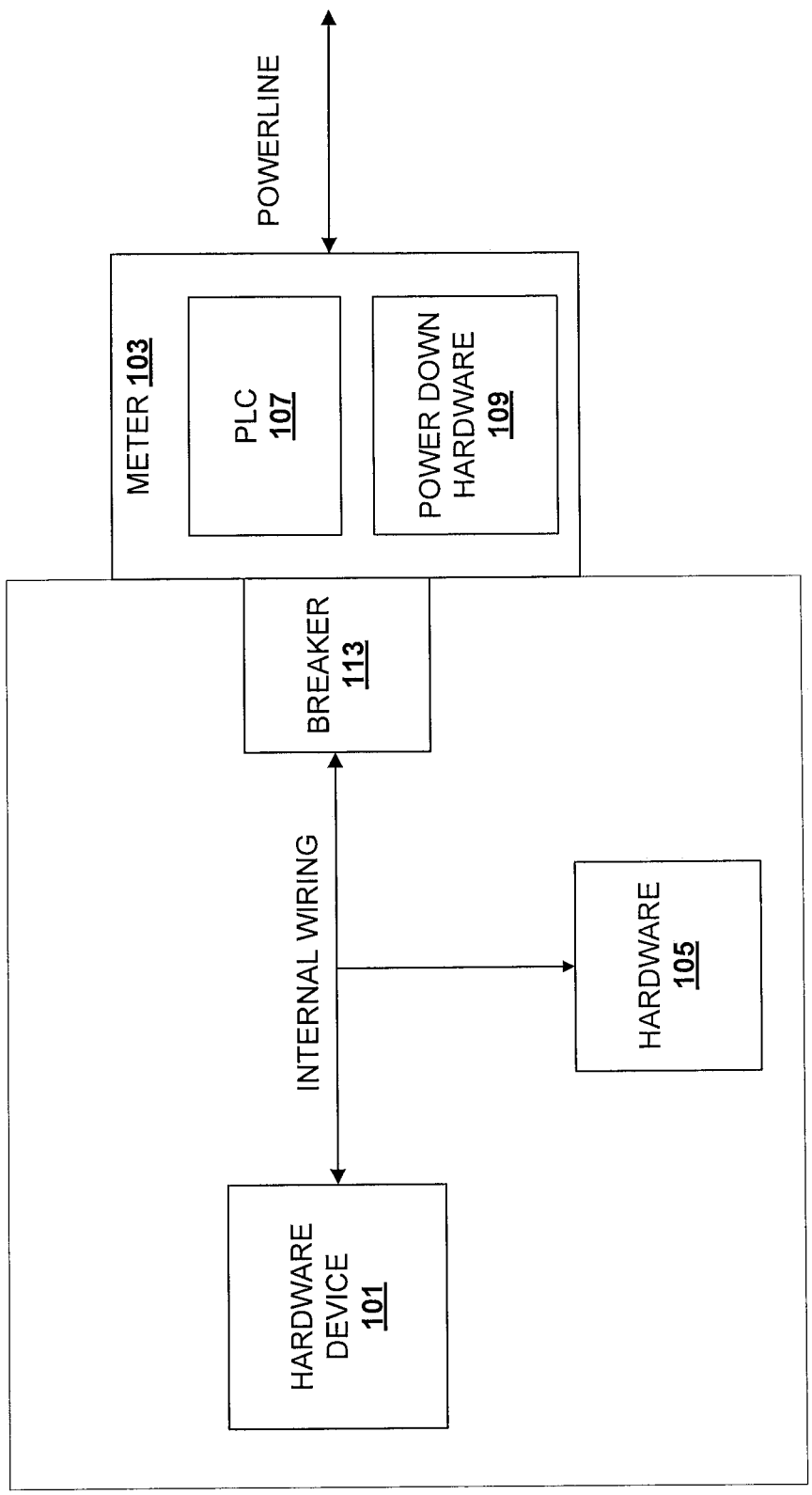
FIG. 1 illustrates an embodiment of a system that utilizes PLC.

FIG. 1 illustrates an embodiment of a system that utilizes PLC. A hardware device 101 is coupled to internal power wiring (e.g., lights, outlets, etc.) and potentially one or more other hardware devices 105 on the wiring. Each device coupled to the wiring may add interference or otherwise degrade PLC either to other devices internal to the premises or external to the premises via the external powerline. Not all of these devices are capable of PLC (for example, many lights are not).

A power meter 103 is coupled to the internal wiring (e.g., via a breaker panel 113) and to the powerline as shown. In this particular illustration, the meter includes hardware for PLC 107 to interface with the internal hardware devices. The PLC hardware 107 may also be used, in some embodiments, for external PLC to, for example, a data concentrator. The meter 103 also includes a powerdown hardware 109. Powerdown hardware 109, upon receiving a signal from a hardware device (such as the hardware device 101 or an external device) causes power to the premises to be temporarily turned off to enable improved PLC as the noise should be less during that off period. Of course, the powerdown hardware 109 does not have to be included in a meter so long as it is capable of turning of portions of internal wiring.

While powerdown hardware 109 and PLC hardware 107 are shown to be internal to the meter 103, in some embodiments, one or both of these pieces of hardware are external.

Figure 2:
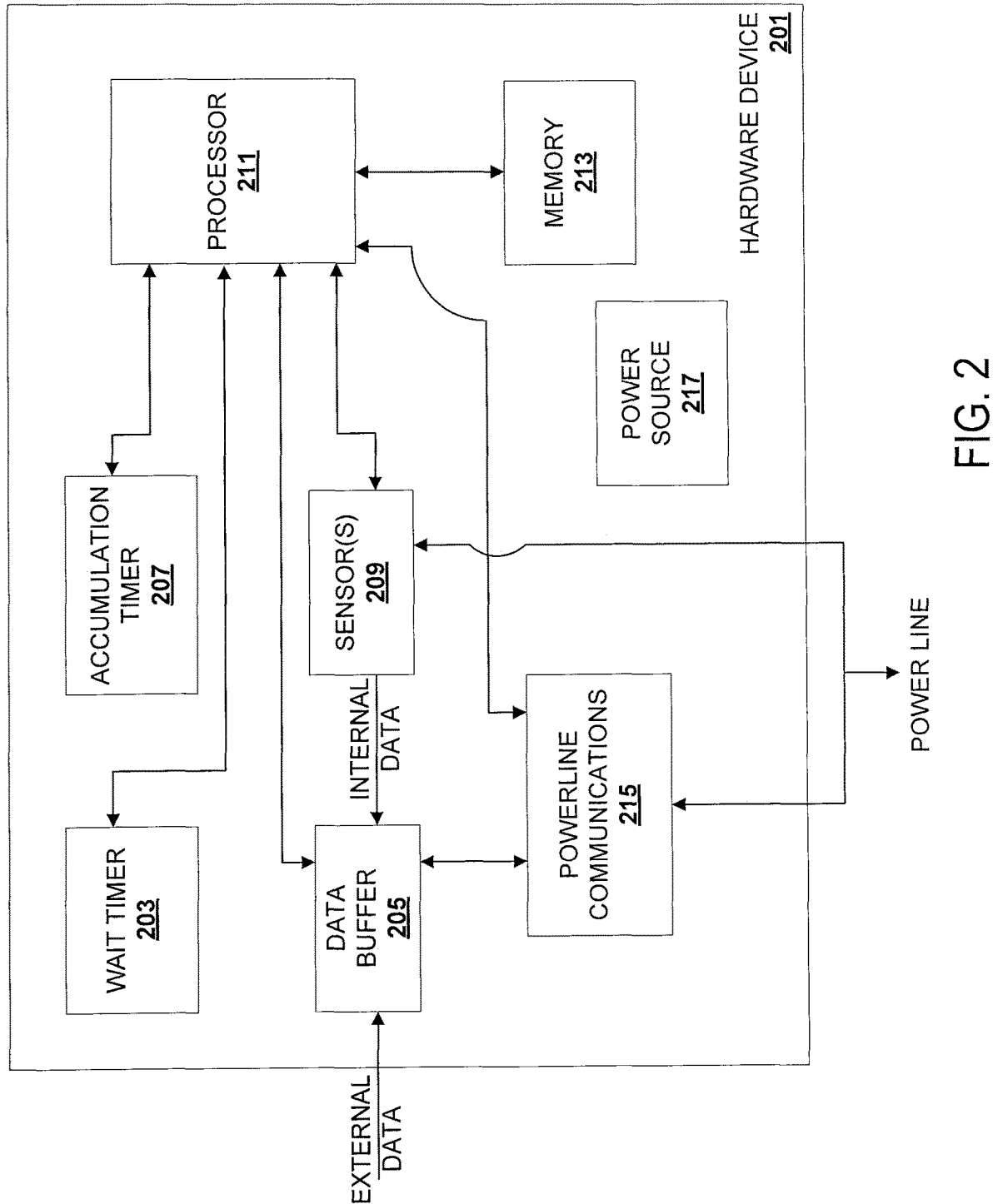
FIG. 2 illustrates an embodiment of a hardware device that utilizes powerline communication (PLC)

FIG. 2 illustrates an embodiment of a hardware device that utilizes powerline communication (PLC). For example, this device may be hardware device 101. The hardware device 201 includes a processor 211 (such as a microcontroller, central processing unit, etc.) to execute instructions stored in memory 213. The memory 213 may be one of many types of memory such as volatile memory (e.g., random access memory) and non-volatile memory (e.g., solid state storage, disk based storage, etc.). In some embodiments, the instructions stored in the memory 213, when executed, perform aspects of one of the methods detailed below.

The hardware device 211 may also include one or more hardware timers. Illustrated are a wait timer 203 and an accumulation timer 207. Wait timer 203 is used in some embodiments to count how long to wait between attempts to look at whether or not to transmit data. Typically, the wait timer 203 counts down. The accumulation timer 207 is used in some embodiments to track how long data has been buffered in data buffer 205. Both timers 203, 207 communicate with the processor 211 to provide their contents. In some embodiments, instead of hardware timers, memory 213 includes timing routines for one or both of the timers 203, 207.

Data buffer 205 stores data to be transmitted via PLC. This data may come from an external source such as an external sensor or come from internal data sources such as internal sensor(s) 209. For example, device 201 may be a PLC modem coupled to an external camera and image, sound or other data captured by the camera would be buffered. Other external devices include motion sensors, light sensors, audio sensors, etc.

Hardware devices 201 that include internal sensors 209 may include sensors for maintenance, usage, malfunction, etc. Exemplary devices include a refrigerator including sensors for maintenance or usage to send data back to the manufacturer, a washer including a sensor that a current cycle is done, a hot water heater including a sensor to detect a malfunction, etc. are contemplated as non-exhaustive examples. In some embodiments, the hardware device 201 includes a noise sensor 209 to determine a noise in the wiring coupled to the hardware device 201.

In some embodiments, the hardware device 201 includes a power source 217 to be used when power is lost to the device. For example, a battery, capacitor, etc. servers as a temporary power source 217 for one or more components of the device. Additionally, in some embodiments, hardware device 101 is capable of entering a lower power mode on command to use less power.

Finally, in most embodiments, the hardware device 201 includes powerline communication hardware (such as a PLC modem) 215 to communicate with other devices internal to the premises or to devices external to the premises through a PLC modem at or near the premises' meter. Alternatively, in some embodiments, a PLC hardware external to the hardware device 201 and coupled to it.

Figure 3:
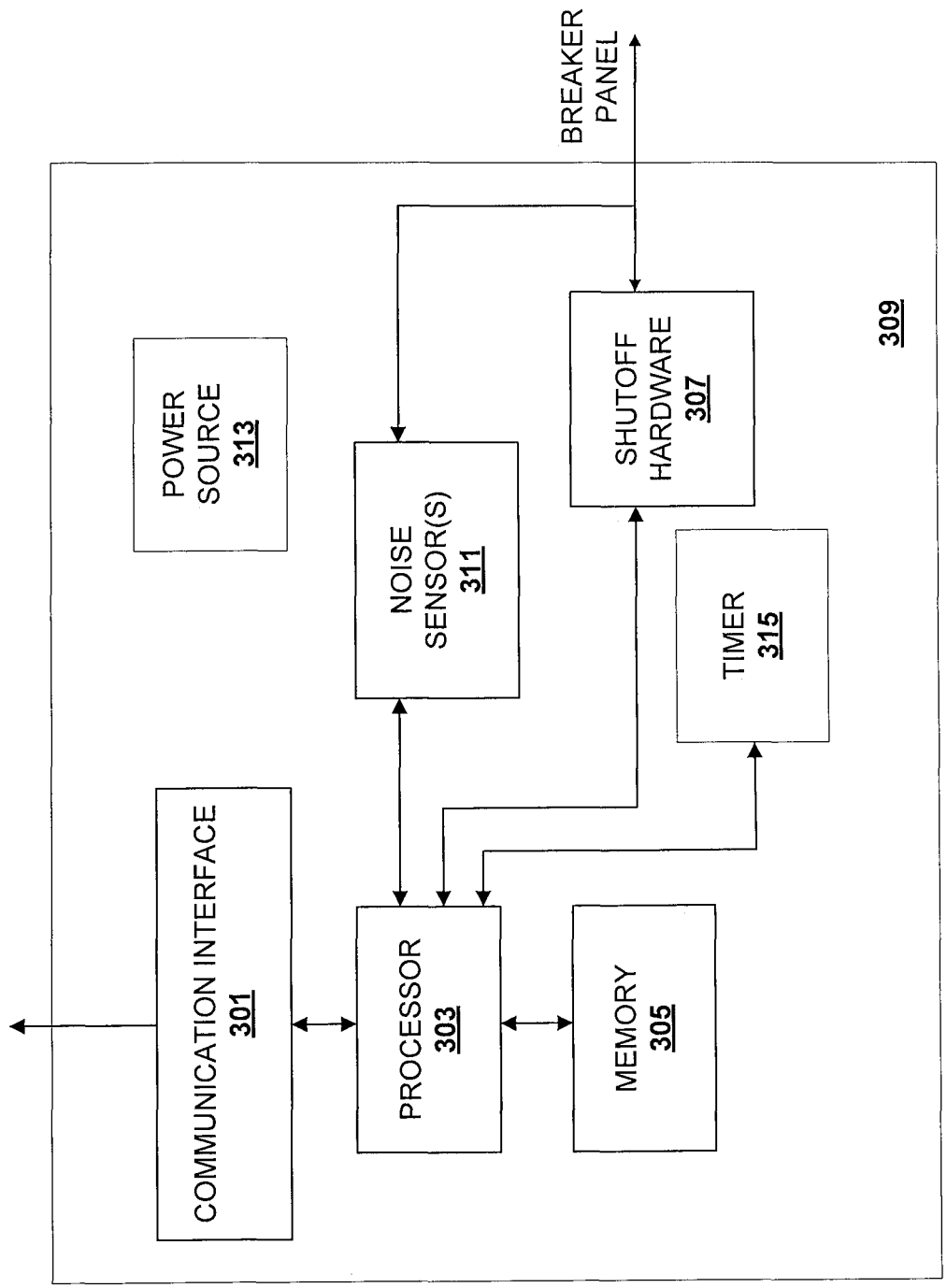
FIG. 3 illustrates an exemplary embodiment of power-down hardware.

An exemplary embodiment of powerdown hardware is illustrated in FIG. 3. The powerdown hardware 309 typically includes a processor 303 (such as a microcontroller, central processing unit, etc.) to execute instructions stored in memory 305. The memory 305 may be one of many types of memory such as volatile memory (e.g., random access memory) and non-volatile memory (e.g., solid state storage, disk based storage, etc.). In some embodiments, the instructions stored in the memory 305, when executed, perform aspects of one of the methods detailed below.

Coupled to the processor 303 is a communication interface 301 (such as a PLC modem), shutoff hardware 307, and at least one noise sensor 311. The communication interface allows the powerdown hardware 309 to communicate with hardware devices inside the premises and/or with devices off premises (such as a utility company). The noise sensor(s) 311 sense or determine noise on internal lines (for example, at the circuit breaker panel) and provide that information to the processor 303 to either store in memory 305 or transmit via the communication interface 301.

The shutoff hardware 307 is used to turn off power to the internal wiring. This shutoff may come in a variety of different ways including, but not limited to, turning off power on a circuit-by-circuit basis at the breaker panel and turning of mains to the internal wiring. Typically, power is not shut off long enough to cause any issues with devices that are plugged into the wiring. In some instances, it may be beneficial to turn off one type of device over others. For example, turning off lighting instead of outlets.

In some embodiments, the power down hardware 309 includes a power source 313 to be used when power is not available (such as being turned off) for one or more components of the device. For example, a battery, capacitor, etc. servers as a temporary power source 309.

In some embodiments, the powerdown hardware 309 maintains an historical record of circuit level noise in memory 305. For example, in some embodiments, the noise sensor 311 continuously monitors noise on the circuits and updates this record. In other embodiments, the noise sensor 311 monitors noise on the circuits as programmed and updates this record.

Finally, in some embodiments, the powerdown hardware 309 includes a hardware timer 315 to count an amount of time that power has been turned off. For example, the timer 309 counts down from a set value provided by the hardware device requesting that power be turned off. Alternatively, the timer 315 counts up to a set value provided by the hardware device requesting that power be turned off.

Figure 4:
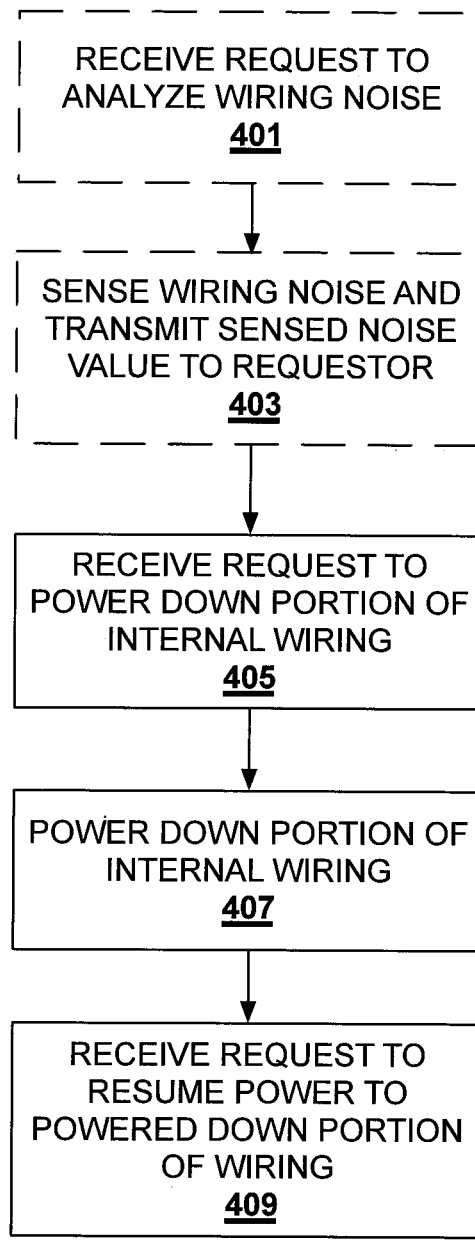
FIG. 4 illustrates a method of operation to be performed by powerdown hardware at a premises.

FIG. 4 illustrates a method of operation to be performed by powerdown hardware at a premises. Referenced below are examples that discuss aspects of the powerdown hardware of FIG. 3, however, this method may be performed by powerdown hardware that is different from that detailed above.

In some embodiments, the powerdown hardware receives a request to analyze wiring noise at 401. In some embodiments, this request includes an identifier of the requester to be stored in memory for later use (such as diagnostics and sending a reply).

In some embodiments, the powerdown hardware uses its internal noise sensor(s) 311 to determine internal wiring noise at 403 in response to the request. In other embodiments, noise is sensed irrespective of a request as noted above. In other embodiments, hardware devices report out their own view of wiring noise which the powerdown hardware uses to calculate an overall, or per circuit, view of noise. The sensed noise value is transmitted to the requester after it has been sensed.

A request to power down a portion of the internal wiring of the premises is received at 405. For example, a request from a hardware device is received over communication interface 301 to turn off one or more circuits. This request is passed to the processor 303 for handling. Similar to what has been detailed above, in some embodiments, this request includes an identifier of the requester to be stored in memory for later use (such as diagnostics and sending a reply). Additionally, in some embodiments, the request includes a desired noise floor.

At 407, a portion of the internal wiring is powered down. For example, shutoff hardware 307 is activated to turn off one or more circuits at the breaker panel. In some embodiments, when the request includes a desired noise floor, the powerdown hardware selectively turns off circuits to achieve the desired noise floor.

A request to resume power to the powered down portion of the wiring is received at 409. This request is typically received from the same device that asked that the portion be turned off.

Figure 5:
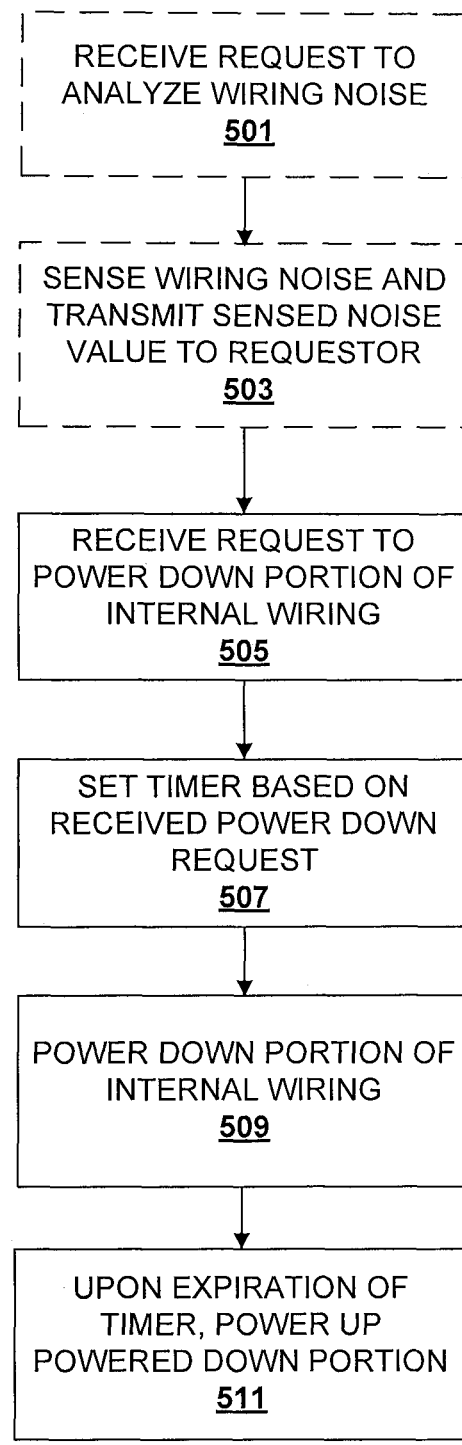
FIG. 5 illustrates a method of operation to be performed by powerdown hardware at a premises.

FIG. 5 illustrates a method of operation to be performed by powerdown hardware at a premises. Referenced below are examples that discuss aspects of the powerdown hardware of FIG. 3, however, this method may be performed by powerdown hardware that is different from that detailed above.

In some embodiments, the powerdown hardware receives a request to analyze wiring noise at 501. In some embodiments, this request includes an identifier of the requester to be stored in memory for later use (such as diagnostics and sending a reply).

In some embodiments, the powerdown hardware uses its internal noise sensor(s) 311 to determine internal wiring noise at 503 in response to the request. In other embodiments, noise is sensed irrespective of a request is noted above. In other embodiments, hardware devices report out their own view of wiring noise which the powerdown hardware uses to calculate an overall, or per circuit, view of noise. The sensed noise value is transmitted to the requester after it has been sensed.

A request to power down a portion of the internal wiring of the premises is received at 505. For example, a request from a hardware device is received over communication interface 301 to turn off one or more circuits. This request is passed to the processor 303 for handling. This request includes a timing value for an amount of time to power down a portion of the internal wiring. Similar to what has been detailed above, in some embodiments, this request includes an identifier of the requester to be stored in memory for later use (such as diagnostics and sending a reply). Additionally, in some embodiments, the request includes a desired noise floor. In some embodiments, when the request includes a desired noise floor, the powerdown hardware selectively turns off circuits to achieve the desired noise floor.

A timer is set and activated in the powerdown hardware at 507 based on the received powerdown request's timing value. For example, timer 315 is set and started.

At 507, a portion of the internal wiring is powered down. For example, shutoff hardware 307 is activated to turn off one or more circuits at the breaker panel. As noted above, in some instances it is less disruptive to only turn off a subset of circuits that are not as critical such as lighting. Additionally, some traditional lighting systems are exceptionally noisy.

Upon an expiration of the timer, power is resumed to the powered down portion of the wiring is received at 511.

Figure 6:
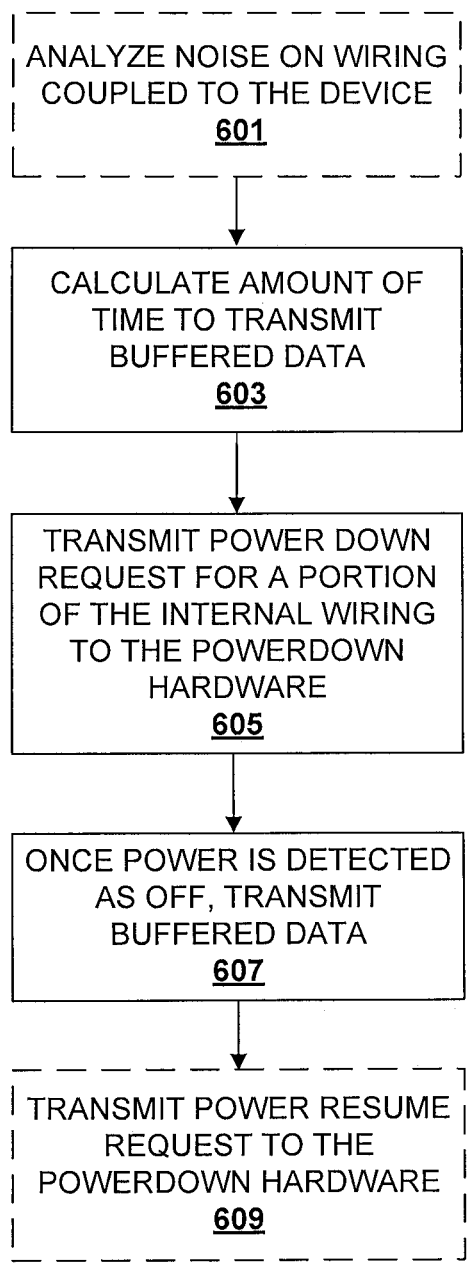
FIG. 6 illustrates a method of operation to be performed by a hardware device at a premises.

FIG. 6 illustrates a method of operation to be performed by a hardware device at a premises. Referenced below are examples that discuss aspects of the hardware device of FIG. 2, however, this method may be performed by hardware device that is different from that detailed above.

In some embodiments, the hardware device 201 uses its internal noise sensor(s) 209 to determine internal wiring noise at 601. In other embodiments, noise is sensed by external sensors and received and analyzed.

An amount of time to transmit data buffered by the hardware device 201 is calculated at 603. For example, the size of the data buffered by the data buffer 205 is divided by a rate of speed available to the hardware device 201 for PLC. Additional calculations may need to be made to account for any packetization that is used in PLC.

A request to power down for a portion of the internal wiring on the premises is transmitted to the powerdown hardware at 605. For example, a request is transmitted over the internal wiring using PLC hardware 215. The request may include several pieces of data, including, but not limited to one or more of: an identifier of the requester; a timing value for an amount of time to power down a portion of the internal wiring; and a desired noise floor.

At 607, once the requested portion of the internal wiring is detected as powered down, the buffered data is transmitted using PLC.

In some embodiments, a power resume request is transmitted to the powerdown hardware upon completion of the transmission of the buffered data at 609.

Figure 7A:
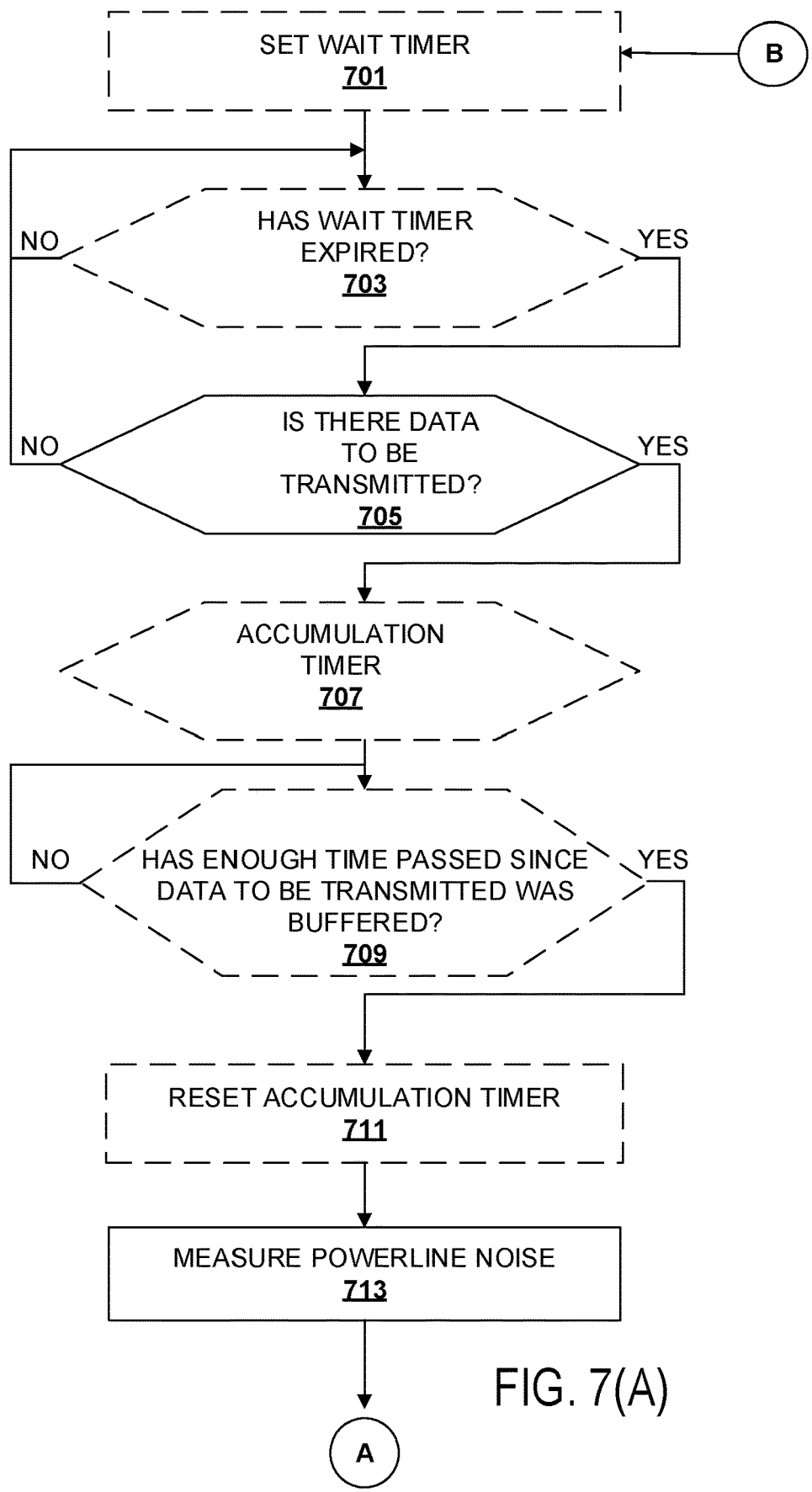
FIGS. 7A-C illustrate a detailed method of PLC using power down according to an embodiment.
Figure 7B:
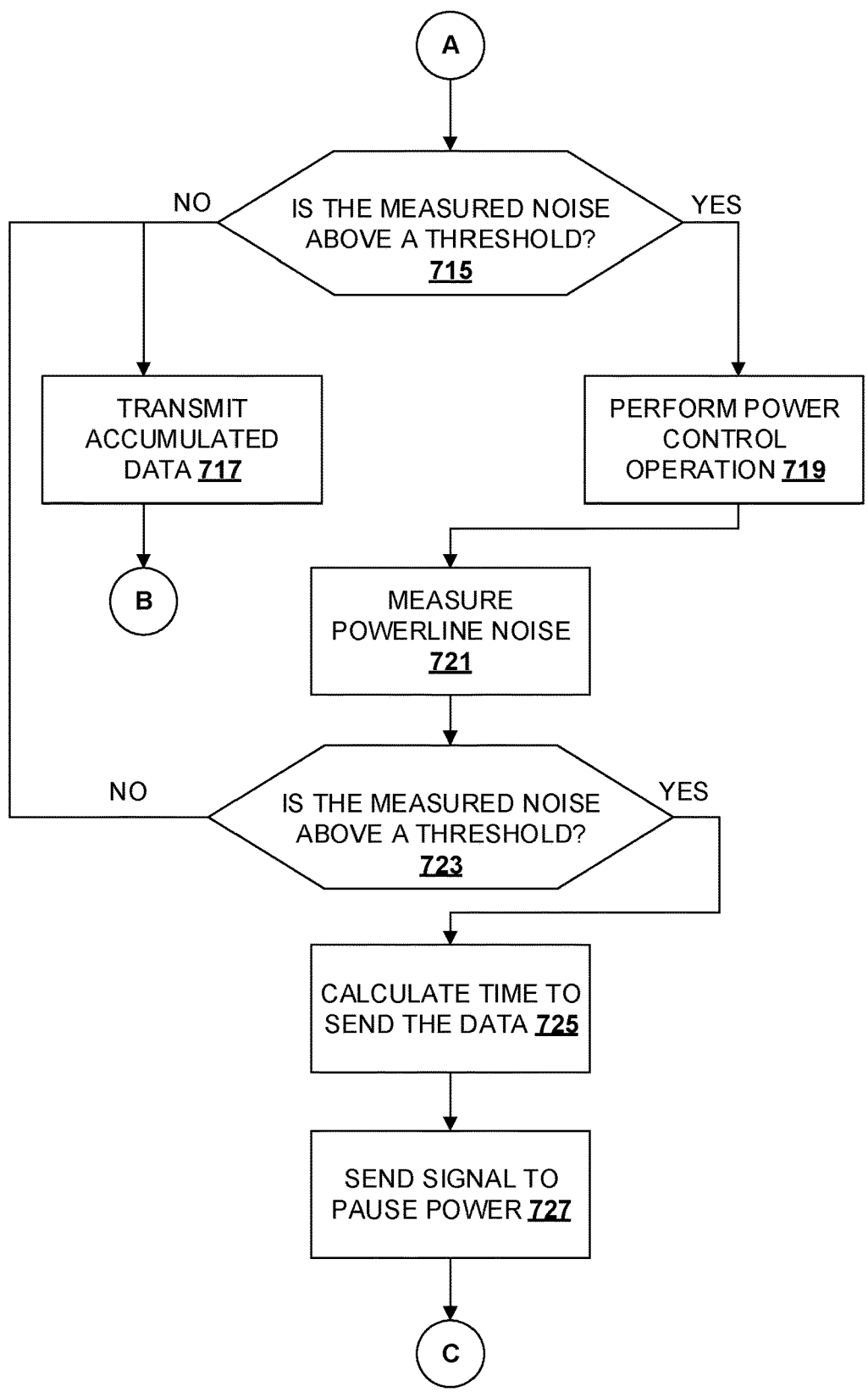
Figure 7C:
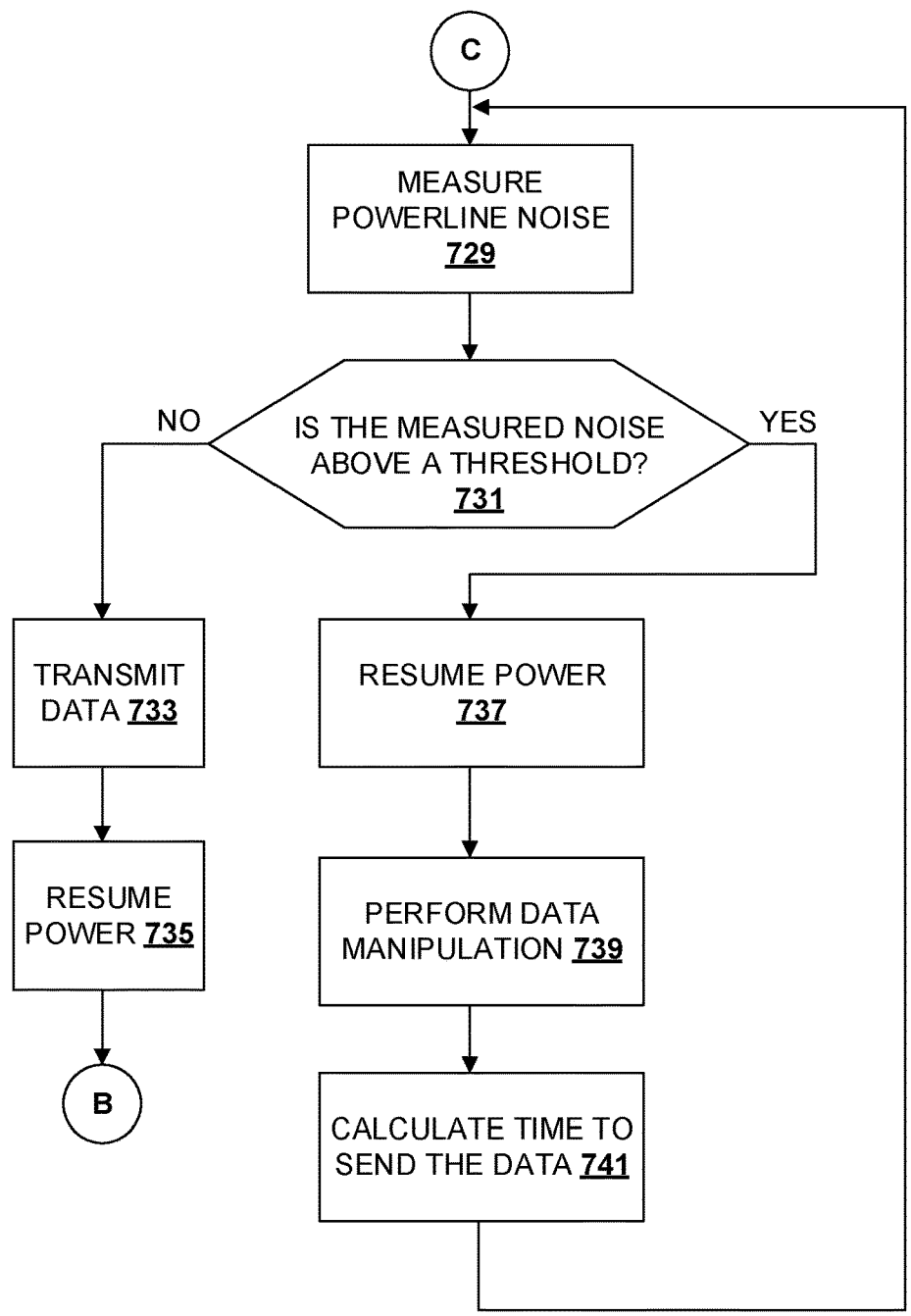

FIGS. 7A-C illustrate a detailed method of PLC using power down according to an embodiment. Referenced below are examples that discuss aspects of the powerdown hardware of FIG. 3 and the hardware device of FIG. 2, however, this method may be performed by hardware that is different from that detailed above.

In FIG. 7A, at 701, a wait timer 203 is set in the hardware device 201 in some embodiments. The wait timer is used to determine if enough time has passed since a previous attempt at PLC.

A determination of if the wait timer has expired is made by the hardware device 201 at 703 in some embodiments. If not, then a follow-up determination will be made at a later point.

If yes, then a determination of if there is buffered data to be transmitted is made at 705. For example, does the data buffer 205 include data to be transmitted? In some embodiments, this determination is against a threshold such that the data buffer 205 as an amount of data greater than the threshold. If not, then a follow-up determination will be made at a later point.

When there is buffered data to be transmitted, in some embodiments, an accumulation timer is started at 707. This timer determines if enough time has passed that the data should be sent out. It is normally undesirable to have "stale" data that sits in the buffer without being processed.

A determination of if enough time has passed since the data to be transmitted was buffered is made at 709 according to some embodiments. In other words, has the accumulation timer reached a point where the data should be transmitted regardless of the amount of data buffered?

When enough time has passed, then the accumulation time is reset at 711 and internal powerline noise is measured at 713. The noise may be measured by the powerdown hardware or individual hardware devices as discussed above.

In FIG. 7B, a determination of if the measured noise is above a threshold is made at 715. In some embodiments, this threshold is programmable.

When it is not, then the accumulated data is transmitted at 717 and the process starts over. In this scenario, the noise is not significant enough to prevent desired PLC. When it is above the threshold, a power control operation is performed at 719. For example, forced entry into low power mode including reducing current, voltage, etc. of one or more hardware devices is performed.

Internal powerline noise is measured at 721 as detailed above.

A determination of if the measured noise is above a threshold is made at 723.

When it is not, then the accumulated data is transmitted at 717 and the process starts over. In this scenario, the noise is not significant enough to prevent desired PLC. When it is above the threshold, a calculation of an amount of time to send the data is performed at 725 as detailed earlier.

A signal to turn off (or pause) power is sent by the hardware device to the powerdown hardware at 727.

In FIG. 7C, an internal powerline noise is measured at 729 as detailed above and a determination of if the measured noise is above a threshold is made at 731.

When it is not, then the accumulated data is transmitted at 733 and power is resumed at 735. Resumption of power may occur as a result of a timer in the powerdown hardware expiring, a signal from the hardware device to the powerdown hardware, etc.

When it is above the threshold, power is resumed at 737 and a data and/or transmission manipulation is made at 739. For example, the hardware device may perform one or more of: increasing data redundancy to improve chances of successful data transmission; adjusting a transmission frequency; decreasing a data rate to send data (e.g., lower video camera resolution); etc.

A calculation of an amount of time to send the data is performed at 741 as detailed earlier.

Other considerations that may alter a transmission include the time of day (for example, turning off power to a portion of a premises at night is likely to be less disruptive), the day of the week (for example, turning off power to a portion of a premises over a weekend is likely to be less disruptive), holidays, etc. These considerations may be taken into account before any determination of sending data is made.

Different embodiments of the invention may be implemented using different combinations of software, firmware, and/or hardware. Thus, the techniques shown in the figures can be implemented using code and data stored and executed on one or more electronic devices (e.g., an end system, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

We claim:

1. A method comprising:
    determining that a data buffer of a hardware device has data to transfer using powerline communication;
    measuring powerline noise in internal wiring coupled to the hardware device;
    calculating a time to send the data;
    sending a signal to cause at least a portion of the internal wiring to be turned off prior to transmitting the data of the data buffer of the hardware device when the measured powerline noise is below a threshold; and
    transmitting the data of the data buffer when the measured powerline noise is below a threshold.

2. The method of claim 1, further comprising:
    performing a power control operation when the measured powerline noise is above a threshold.

3. The method of claim 2, wherein the power control operation comprising forcing at least one hardware device coupled to the internal wiring to enter a low power mode.

4. The method of claim 1, wherein the hardware device is powered by an internal power source while the portion of the internal wiring is turned off.

5. The method of claim 4, wherein the internal power source is a battery.

6. The method of claim 4, wherein the internal power source is a capacitor.

7. The method of claim 1, further comprising:
    after transmitting the data, sending a signal to turn power back on to the portion of the internal wiring that was turned off.

8. The method of claim 1, further comprising:
    activating an accumulation timer;
    determining that enough time has passed since data was the data was placed into the data buffer based on the accumulation timer; and
    resetting the accumulation time when enough time has passed.

9. The method of claim 1, further comprising manipulating the as a result of the measured noise and amount of data to be sent by increasing data redundancy.

10. The method of claim 1, further comprising manipulating the as a result of the measured noise and amount of data to be sent by decreasing the transmitting speed.

* * * * *